(12) United States Patent
White et al.

(10) Patent No.: US 9,143,018 B2
(45) Date of Patent: Sep. 22, 2015

(54) POWER GENERATION SYSTEM WITH CONTROLLED ENCLOSURE OPENINGS

(71) Applicant: Kohler Co., Kohler, WI (US)

(72) Inventors: Timothy W. White, Kohler, WI (US); Robert J. Danforth, III, Sheboygan Falls, WI (US); Jeffrey J. Neis, Sheboygan, WI (US); Mark F. McMullen, Adell, WI (US)

(73) Assignee: Kohler Co., Kohler, WI (US)

( * ) Notice: Subject to any disclaimer, the term of this patent is extended or adjusted under 35 U.S.C. 154(b) by 153 days.

(21) Appl. No.: 13/789,878

(22) Filed: Mar. 8, 2013

(65) Prior Publication Data

US 2014/0252777 A1 Sep. 11, 2014

(51) Int. Cl.
*H02K 9/02* (2006.01)
*H02P 9/04* (2006.01)
*F02B 63/04* (2006.01)
*F01P 7/10* (2006.01)
*F01P 1/00* (2006.01)

(52) U.S. Cl.
CPC ... *H02K 9/02* (2013.01); *F01P 7/10* (2013.01); *F02B 63/044* (2013.01); *H02P 9/04* (2013.01); *F01P 2001/005* (2013.01); *F01P 2025/62* (2013.01)

(58) Field of Classification Search
CPC .............. H02K 9/02; H02K 9/04; H02P 9/04; F02B 63/044; F01P 2001/005; F01P 2025/62
See application file for complete search history.

(56) References Cited

U.S. PATENT DOCUMENTS

| | | | |
|---|---|---|---|
| 4,733,750 A | 3/1988 | Poirier et al. | |
| 4,835,405 A | 5/1989 | Clancey et al. | |
| 4,924,826 A * | 5/1990 | Vinson | 123/195 C |
| 6,142,108 A * | 11/2000 | Blichmann | 123/41.05 |
| 6,376,944 B1 | 4/2002 | Grizzle, Jr. et al. | |

(Continued)

FOREIGN PATENT DOCUMENTS

| | | |
|---|---|---|
| CN | 102383910 A | 3/2012 |
| EP | 2787190 A1 | 10/2014 |

(Continued)

OTHER PUBLICATIONS

"European Application Serial No. 14156978.0, European Search Report mailed Nov. 6, 2014", 11 pgs.

*Primary Examiner* — Lindsay Low
*Assistant Examiner* — Jacob Amick
(74) *Attorney, Agent, or Firm* — Schwegman Lundberg & Woessner, P.A.

(57) ABSTRACT

A power generation system that includes a generator comprising an alternator and an internal combustion engine configured to drive the alternator to generate power. The power generation system may provide power to one or more loads. The power generation system may further include an enclosure that houses the internal combustion and the alternator. The enclosure may include one or more openings and that permit air to flow into or out of the enclosure. The power generation system may include a mechanism that may regulate the flow of air through the openings in the enclosure. The mechanism may include a cover that may be positioned adjacent to the opening. The mechanism may control the position of the cover. The power generation system may further include a module that may monitor or measure a load of the power generation system and provide control to the mechanism.

20 Claims, 6 Drawing Sheets

(56) References Cited

U.S. PATENT DOCUMENTS

| | | |
|---|---|---|
| 6,552,454 B2 | 4/2003 | Kern et al. |
| 6,784,574 B2 | 8/2004 | Turner et al. |
| 6,824,067 B2 | 11/2004 | Kern et al. |
| 7,105,960 B2 | 9/2006 | Oolwa |
| 7,314,395 B2 | 1/2008 | Bryham |
| 7,485,977 B2 | 2/2009 | Annen et al. |
| 7,492,050 B2 | 2/2009 | Brandenburg et al. |
| 8,186,314 B2 | 5/2012 | Brunelli et al. |
| 2008/0134996 A1 | 6/2008 | Onodera et al. |
| 2010/0068983 A1 | 3/2010 | Williams |
| 2011/0172966 A1* | 7/2011 | Albsmeier et al. ............ 702/183 |
| 2011/0248511 A1* | 10/2011 | Marlenee et al. ............ 290/1 A |
| 2012/0239273 A1* | 9/2012 | Nakatsuji et al. ............ 701/102 |

FOREIGN PATENT DOCUMENTS

| | | |
|---|---|---|
| JP | 61-1620 U | 1/1986 |
| WO | WO-00/12901 A1 | 3/2000 |

* cited by examiner

POWER GENERATION SYSTEM WITH CONTROLLED ENCLOSURE OPENINGS

1. TECHNICAL FIELD

This disclosure generally relates to a power generation system, and more specifically relates to a power generation system that includes controlled enclosure openings.

2. BACKGROUND

Electronic devices are increasingly used and relied for performing countless tasks in all areas of life. Many important electronic devices need continuous power to ensure constant and uninterrupted operation.

Often, the power necessary for the operation of electrical equipment is supplied by a primary power source, such as a utility company. However, power from the primary power source may occasionally be interrupted, such as during inclement weather. Additionally, in some instances, an electronic device may require more power than a primary power supplier may typically provide. In still other instances, electronic devices may be operated when no primary power source is available (e.g., utility power is lost).

Secondary power sources, such as generators, may be used to satisfy the power needs of electronic devices where primary power is unavailable or insufficient. The secondary power sources may be designed to supply power to the electronic equipment during certain time periods, such as when the primary power source cannot supply the primary power, or when additional power is needed to supplement the power from a primary power source.

A generator is commonly housed within an enclosure that includes openings. The enclosures include openings in order permit the flow of air into and/or out of the enclosure. For example, a generator enclosure usually includes one or more sets of openings that permit cooling air to enter the enclosure and another set(s) of openings that permit heated air to be removed from the enclosure. Fans are often strategically placed within the enclosure in order to facilitate drawing cooling air into the enclosure and forcing heated air from the enclosure.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
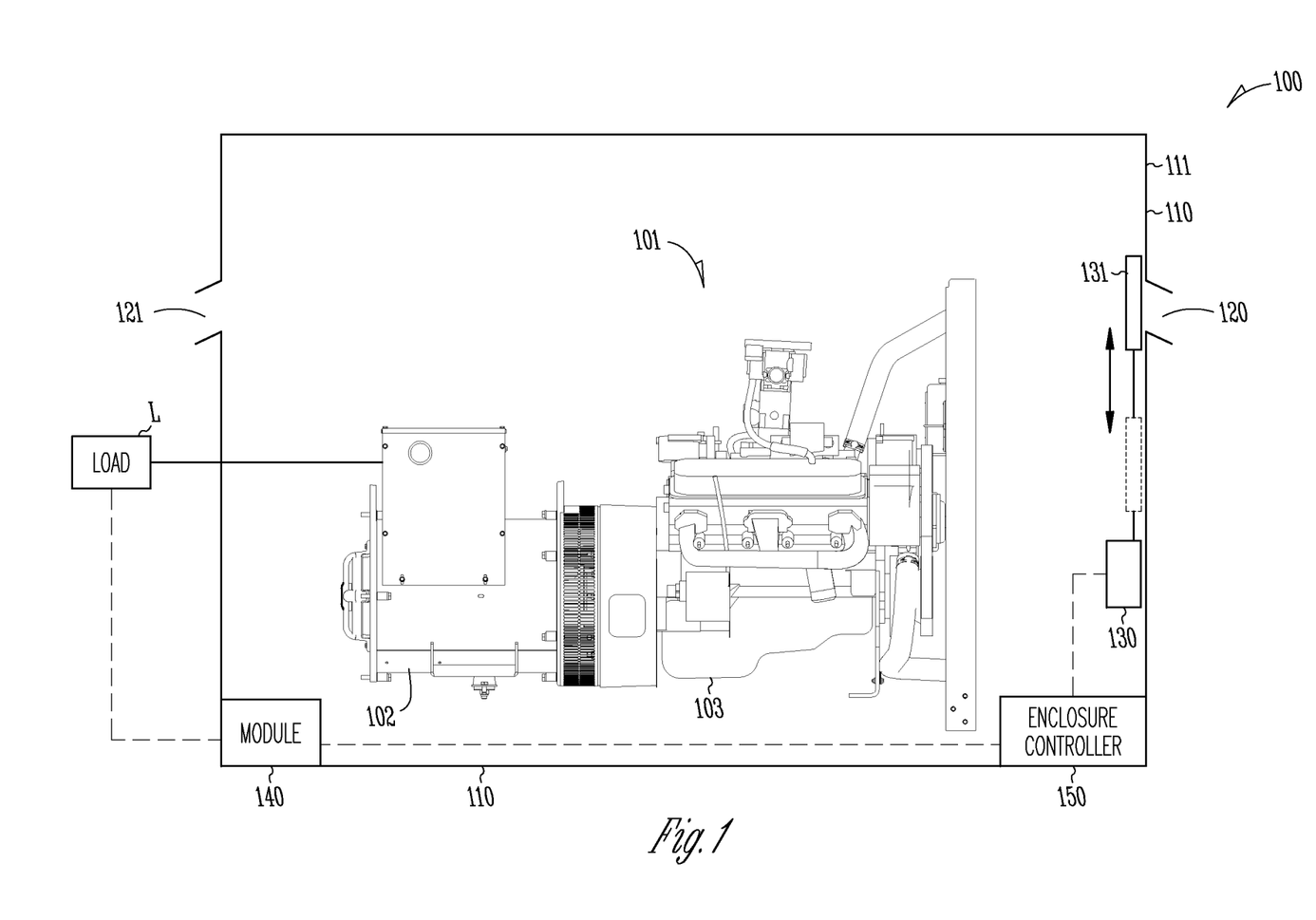
FIG. 1 is an example power generation system.

FIG. 1 is an example of a power generation system 100. The power generation system 100 may include a generator 101 that includes an alternator 102 and an internal combustion engine 103 configured to drive the alternator 102 to generate power. The internal combustion engine 102 may be powered by a fuel or resource, such as natural gas, diesel fuel, propane, gasoline, or various other fuels. The alternator 102 may include or use a rotating magnetic field with a stationary armature, a rotating armature with a stationary magnetic field, or a linear alternator. The power generation system 100 may be connected with, and may provide power to, one or more loads L.

The power generation system 100 may further include an enclosure 110 that houses the internal combustion 103 and the alternator 102. The enclosure 110 may include one or more openings 120 and 121 that permit air to flow into or out of the enclosure 110. For example, cooling air may be drawn into the enclosure 110 through the opening 120, may flow over one or more components of the power generation system 100, and may flow out of the enclosure through opening 121. Other variations are possible.

The power generation system 100 may include a mechanism 130 that may regulate the flow of air through the opening 120 in the enclosure 110. In some power generation systems 100, the mechanism 130 may include a cover 131 that may be positioned adjacent to the opening 120. The mechanism 130 may control the position of the cover 131. The cover 131 may be positioned over part or all of the opening 120. The cover 131 may restrict an air flow through the part or all of the opening 120 that the cover 131 is covering. For example, the cover 131 may be positioned over the entire 120, and may prohibit air from flowing through the opening 120 ("fully-closed position"). Alternatively, the cover 131 may be positioned away from, and not covering, any part of the opening 120 ("fully-open position"). The cover 131 may be movable to any position including and between the fully closed position and the fully-open position.

The mechanism 130 may move the cover 131 when activated. For example, the mechanism 130 may include any type of device that manipulates the cover 131, such as any type of motor, solenoid, thermally expansive materials, hydraulic system, pressure-based system and/or pneumatic system (among other types of devices).

The cover 131 may include any type of member (or combination of members) that is capable of obstructing the opening 120. For example, the cover 131 may include any type of louver, linkage, hinge, rubber flap, metal plate(s) and/or blinds (among other devices), that may be moved relative to the opening 120 in order to regulate air flow through the opening 120.

Even though the mechanism 130 and cover 131 are shown as being inside the enclosure 110, either or both the mechanism 130 and cover 131 may be partially inside and outside the enclosure 110, or entirely outside the enclosure 110, depending on the type of mechanism 130 and/or cover 131 that is utilized in the power generation system 100.

The power generation system 100 may further include a module 140. The module 140 may monitor or measure a parameter of the power generation system 100. For example, the module 140 may monitor a load L that is connected with the generator 101. In some power generation systems 100, the module 140 may be an engine control module that monitors a throttle of the internal combustion engine 103. The module 140 may additionally or alternatively be a sensor which may measure various other parameters of the power generation system 100, such as oil temperature, engine temperature, ambient temperature, oil level, air flow, fuel level, weather conditions, engine speed, power output, or various other parameters. Alternatively, the module 140 may control other portions of the engine 103 and/or alternator 102 depending on the capabilities of the module 140.

An enclosure controller 150 may selectively manipulate the mechanism 130, and/or move the cover 131, based on data, parameters, or conditions (such as the load L) monitored by the module 140. The enclosure controller 150 may thus control a position of the cover 131, which in turn may control or regulate an amount of air that may pass through an opening 120 or 121 of the enclosure. The enclosure controller 150 may use any parameters or combinations of parameters from one or more modules 140 to manipulate the mechanism 130. The enclosure controller 150 may send one or more signals or instructions (wired or wirelessly) to the mechanism 130 to perform various actions. For example, the enclosure controller 150 may instruct a motor operating as the mechanism 130 to rotate a certain number of times, which in turn may move the cover 131 connected with the motor to a desired and calculated location. In other examples, the enclosure controller 150 may directly operate the mechanism 130 to move the cover 131. In still other examples, the enclosure controller 150 and the mechanism 130 may be part of one system, and the enclosure controller 150 may itself perform one or more actions to move the cover 131. In some systems, the module 140 and the enclosure controller 150 may also or alternatively be part of the same system. Various other ways of manipulating or controlling the mechanism 130 and/or a position of the cover 131 are possible.

The enclosure controller 150 may manipulate or control the mechanism 130 and/or the cover 131 at any point based on the parameters monitored, such as continuously, at intervals, when a parameter has changed, when a parameter has exceeded or dropped below one or more threshold levels, randomly, when triggered by a user, or at various other times. As an example, the enclosure controller 150 may manipulate the mechanism 130 to change or update a position of the cover 131 whenever a load changes by at least 10% (or another designated percentage). In another example, the enclosure controller 150 may manipulate the mechanism 130 to change or update a position of the cover whenever the enclosure controller 150 determines that the generator 101 is operating in an exercise mode and an oil temperature increases by 5 degrees (or another threshold amount). Various other examples are possible.

Figure 2:
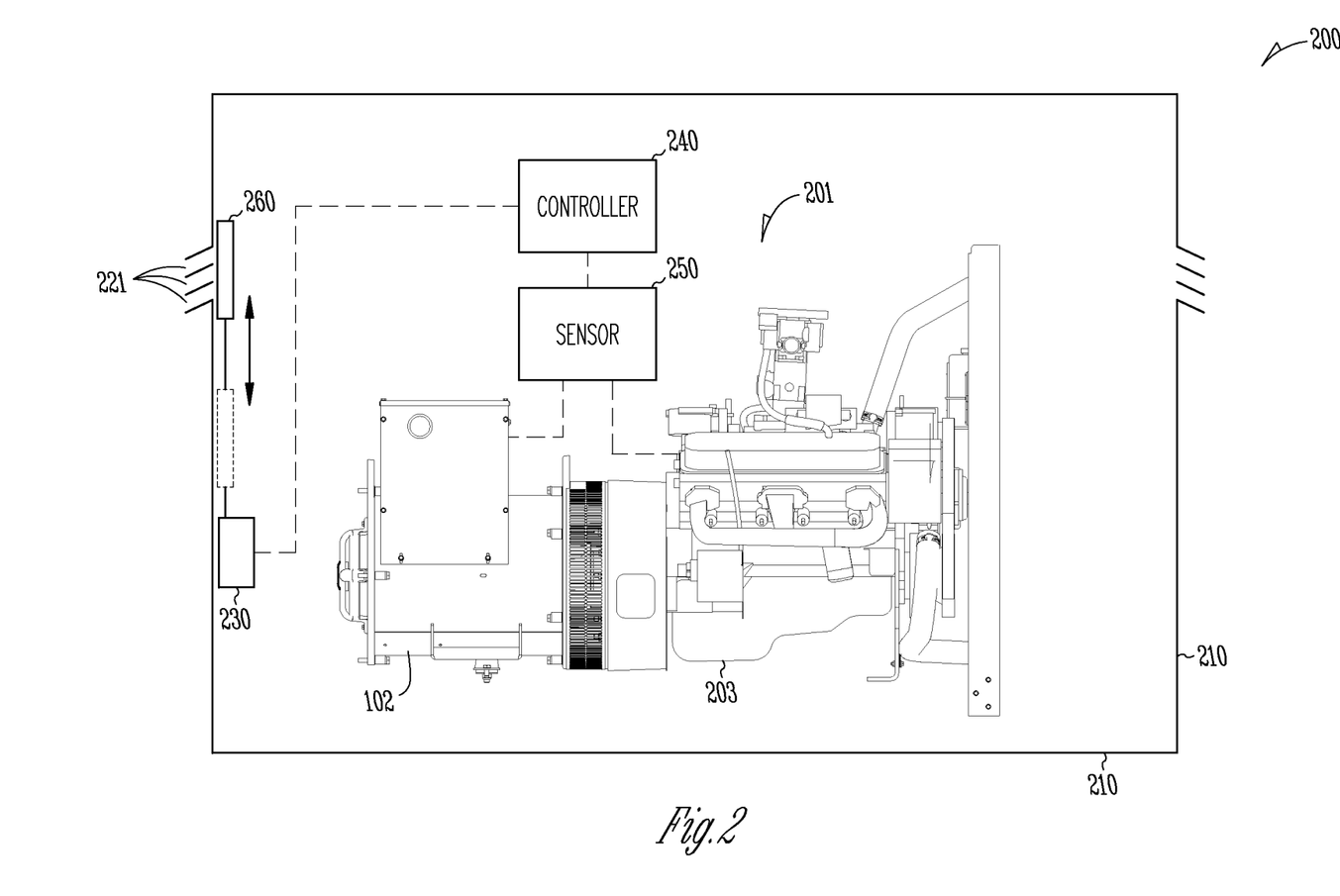
FIG. 2 is another example power generation system.

FIG. 2 shows another example power generation system 200. The power generation system 200 may include a generator 201 that includes an alternator 202 and an internal combustion engine 203 that drives the alternator 202 to generate power. The power generation system 200 may also include an enclosure 210 that houses the internal combustion engine 203 and the alternator 202. The enclosure 210 may include one or more openings 221 that permit air flow into or out of the enclosure 210.

The power generation system 200 may also include a mechanism 230. The mechanism 230 may regulate the air flow through the opening 221. The generator 201, alternator 202, internal combustion engine 203, enclosure 210, and openings 221 may be the same as, similar to, or different from the generator 101, alternator 102, internal combustion engine 103, enclosure 110, and openings 120 and 121 of the power generation system 100.

The generator 201 of the power generation system 200 may be configured to operate in two or more different operating modes, such as a normal mode of operation and an exercise mode of operation. The power generation system 200 may also include a controller 240. The controller 240 may manipulate the mechanism 230 to control the air flow through the opening 221 based on the operating mode of the generator 201.

The generator 201 may, for example, operate in a normal mode at various times or when various conditions exist. During a normal mode of operation, the generator 201 may operate under normal power-generation operating conditions, and may operate as a power source for a load L. For example, during operation of the generator 201 in the normal mode, the engine 203 and the alternator 202 may both be operated to generate an electrical energy that is passed to the load L. For example, the generator 201 may operate in a normal mode and provide secondary power when a primary power source is not available to provide primary power, or when primary power is insufficient to meet power needs. In other situations, the generator 201 may operate in the normal mode to provide primary power.

The generator 201 may also or alternatively operate in an exercise mode. The generator 201 may or may not generate any power, or any substantial power when operating in the exercise mode. The operation of the generator 201 in the exercise mode may be different from or similar to the operation of the generator 201 in the normal mode. In some power generation systems 200, most of the parts of the generator 201 may be run as in normal mode. In some power generation systems 200, one or more parts of the generator 201 may not be operated in the exercise mode. For example, during operation of the generator 201 in the exercise mode, the engine 203 of the generator 201 may be operated while an alternator 203 of the generator 201 may not be excited. In other examples, during operation of the generator 201 in the exercise mode, the engine 203 may not be operated while the alternator 202 may be excited during the exercise mode. In some variations, during operation of the generator 201 in the exercise mode, the engine 203 may be run for a predetermined period of time, and/or at one or more predetermined speeds. In some variations, during operation of the generator 201 in the exercise mode, the generator 201 may not provide power or energy to the load L. Other variations and examples of parts of the generator 201 that may be operated during the exercise mode are possible.

In still other examples, the power generation system 200 may operate in various other modes. For example, the power generation system 200 may operate in a noise limiting mode, safety mode, weather-based mode, calendar-based mode and/or geography-based mode.

The controller 240 may instruct or control the mechanism 230 to move the cover 260 based on the operating mode. For example, the controller 240 may instruct the mechanism 230 to move the cover 260 to a fixed position, such as a fully-open position, when the generator 201 is operating in normal mode. In this example, an air flow through the openings 221 may be at a maximum level and may not be inhibited by the cover 260.

The controller 240 may additionally or alternatively instruct the mechanism 230 to move the cover 260 to any of a plurality of positions when the generator 201 is operating in the exercise mode. For example, the controller 240 may instruct the mechanism 230 to move the cover 260 during an exercise mode to an intermediate position where some or all of the openings 221 are partially or completely covered, restricting some air flow into the enclosure 210. The intermediate position may be any position between or including the fully-open position and the fully-closed position.

The power generation system 200 may further include a sensor 250. The sensor 250 may monitor a condition which may affect the operation of the generator 201.

Various types of sensors 250 are possible and may be used to measure one or more parameters. As an example, the sensor 250 may be a temperature sensor and may measure a temperature of a component, input, or output of the generator 201. For example, the sensor 250 may be an oil temperature sensor or an oil pan sensor configured to measure a temperature of an oil of the engine 203. The oil temperature sensor may be a surface mount thermocouple sensor. The surface mount thermocouple may be positioned adjacent to or on a surface of an oil pan or oil containment compartment of the generator 201. Other examples of temperature sensors may include a coolant temperature sensor, an exhaust temperature sensor, an engine temperature sensor, an enclosure temperature sensor, an external temperature sensor, or various other temperature sensors. The sensor 250 may also be configured to monitor a sound level that is produced by the generator 201.

The sensor 250 may alternatively be a different type of sensor and may measure a parameter other than temperature. For example, the sensor 250 may be an oil pressure sensor and may be configured to measure the oil pressure of the engine 203. As another example, the sensor 250 may be a chemical or compositions sensor. The sensor 250 may be a sensor configured to measure moisture content of the oil of the engine 203. The sensor 250 may be a viscosity sensor configured to measure a viscosity of engine 203 oil. In some power generation systems 200, multiple sensors of different types or measuring different parameters may be used. Various other sensors are possible.

The controller 240 may manipulate the mechanism 230 based on the monitored condition and/or an operating mode of the generator 201. As an example, the controller 240 may manipulate the mechanism 230 to close some, or all, of the openings 221 based on the sound level that is produced by the generator 201.

In some systems, the controller 240 may manipulate the mechanism 230 based on the monitored condition when the generator 201 operates in the exercise mode. In addition, the controller 240 may ignore the monitored condition when the generator 201 operates in the normal mode.

In some systems, the controller 240 may control the intermediate position of the cover 260 based on a condition monitored by the sensor 250. Where the sensor 250 is an ambient temperature sensor, for example, the controller 240 may move the cover 260 to an intermediate position closer to a fully-open position when the ambient temperature is higher, such that air flow through the enclosure 210 is increased at higher temperature. The controller 240 may also move the cover 260 to an intermediate position closer to a fully-closed position when the ambient temperature is lower, such that a temperature within the enclosure 210 is increased faster at lower outdoor temperatures. In some instances, the controller 240 may only control the intermediate position when the generator 201 is operating in the exercise mode, and may ignore the monitored condition when the engine is in the normal mode or an off mode. Other variations are possible. In some power generation systems 200, the enclosure 210 may include a plurality of openings 221. The mechanism 230 may control or regulate the air flow through the plurality of openings 221. As an example, one or more controllers 240 may manipulate the mechanism(s) 230 to independently regulate the air flow through each of the plurality of openings 221.

In some systems, the controller 240 may be programmed, or may determine, which openings 221 to be opened based on a fan location. As another example, the controller 240 may manipulate the mechanism 230 to move particular openings to the fully-opened position when a fan 260 that is adjacent to the respective opening 221 is operating.

The controller 240 may additionally or alternatively determine specifications for operating the generator 201 in the exercise mode. The controller 240 may additionally or alternatively instruct the generator 201 to operate in the exercise mode according to the determined specifications. For example, the controller 240 may determine and control when the generator 201 should start or stop operating in the exercise mode. As another example, the controller 240 may determine and control a speed or operating level that the generator 201 should operate at during the exercise mode. Other examples are possible.

The controller 240 may communicate with, and use information from, the sensor 250 in determining the specifications for operating the generator 201 in the exercise mode. The sensor 250 may communicate information to the controller 250 in various ways, such as through a bus, wired communication line, wirelessly, or in various other ways. In some systems, the sensor 250 may be directly coupled to an input of the controller 240. In other systems, the sensor 250 may communicate a measured parameter to the controller 250 indirectly, such as by or through a separate control module, such as an engine control unit. In some of these systems, the separate control module may then communicate the measured parameter information to the controller 240.

The controller 240 may receive the information from the sensor 250 continuously, periodically, at intervals, upon request, when triggered by an event, randomly, or at various other times. The controller 240 may control the sensor 250 to control power to the sensor 250 or request data. For example, the controller 240 may request and receive data from the sensor 250 prior to or upon initialization of the exercise mode. The controller 240 may additionally or alternatively receive data from the sensor 250 as the generator 201 operates in the exercise mode. Other examples are possible.

Figure 3:
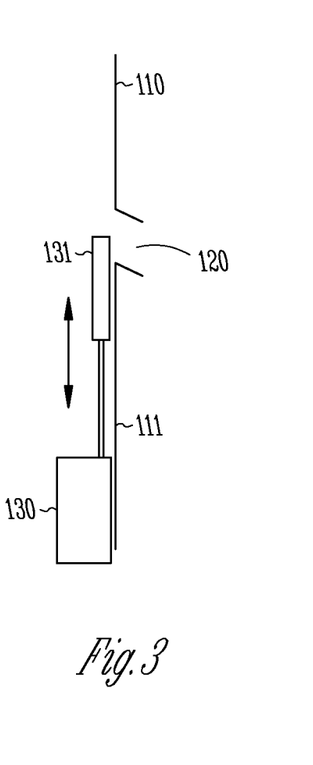
FIGS. 3-4 are schematic front views of a portion of an example generator enclosure where an opening in the enclosure is partially or fully covered.
Figure 4:
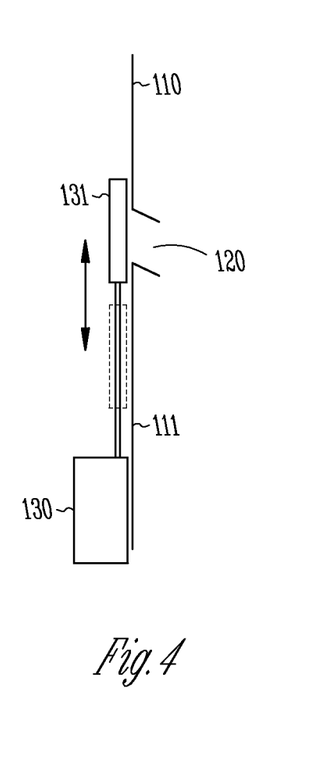

FIG. 3 shows an example cover 131 moving between a partially-closed position where the opening 120 is partially obstructed and a fully-opened position where the cover 131 is uncovered to permit the free flow of air from the enclosure 120. FIG. 4 shows the cover 131 moving between a fully-closed position where the opening 120 is completely covered and a fully-opened position where the cover is uncovered to permit the free flow of air from the enclosure 120. In some power generation systems 100, the enclosure controller 150 may move the cover 131 to any position between the fully-closed position and the fully-opened position based on a monitored parameter, such as the monitored load L.

The enclosure controller 150 may move the cover 131 when a change in the measured parameter, such as a change in a monitored load L, is detected. As an example, the enclosure controller 150 may move the cover 131 in a direction toward the fully opened position when the load L that is connected with the generator 101 increases. In addition, the enclosure controller 150 may move the cover 131 in a direction toward the fully-closed position when the load L that is connected with the generator 101 decreases.

As another example, the enclosure controller 150 may move the cover 131 in a direction toward the fully opened position when the generator 101 is creating less noise. In addition, the enclosure controller 150 may move the cover 131 in a direction toward the fully-closed position when the generator 101 is creating more noise.

Figure 5:
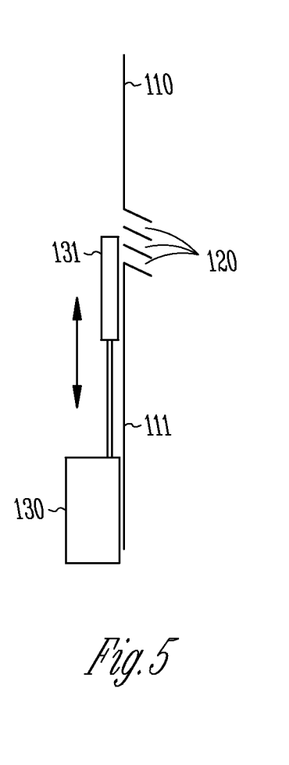
FIGS. 5-6 are schematic front views of a portion of an example generator enclosure where multiple openings in the enclosure are partially or fully covered.
Figure 6:
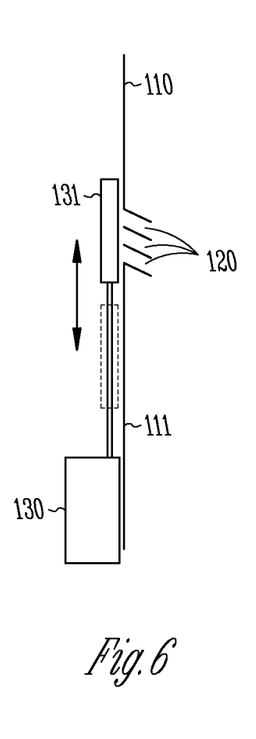

FIGS. 5-6 show an example end wall 111 of the enclosure 110 where the end wall 111 includes a plurality of openings 120. The mechanism 130 may control the air flow through one, some, or all of the plurality of openings 120. For example, FIG. 4 shows an example cover 131 that moves such that the cover 131 covers none or some (but not all) of the openings 120. As another example, FIG. 5 shows an example cover 131 that moves such that the cover 131 covers none, some, or all of the openings 120. The enclosure controller 150 may selectively manipulate the mechanism 130 to cover none, some or all of the openings 120 based on the monitored parameter, such as a monitored load L.

Figure 7:
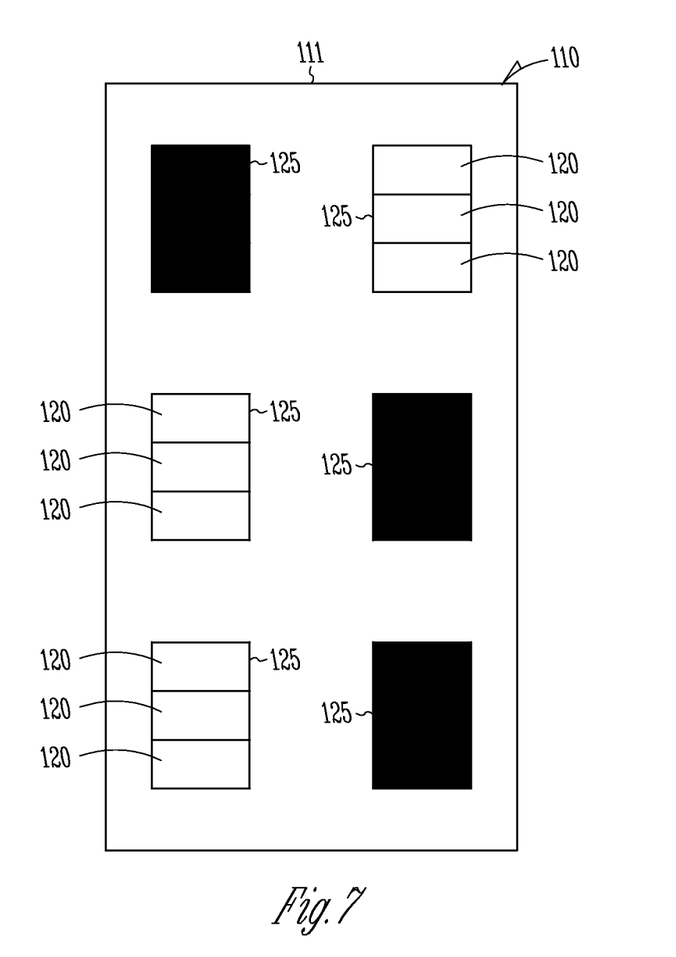
FIG. 7 is a schematic end view of a portion of an example generator enclosure where the enclosure includes multiple sets of openings.

FIG. 7 shows an example of a power generation system 100 that includes an enclosure 110 with an end wall 111 that has a plurality of sets 125 of openings 120. The enclosure controller 150 may close (or open) all, or part, of some of the sets 125 of openings 120 (for example, 3 sets are closed in FIG. 7). The enclosure 150 may control the sets 125 of openings 120 based on the monitored parameter. Although each set 125 of openings 120 are shown in a single end wall 111 of the enclosure 110, the enclosure 110 may include sets 125 of outlet openings 120 and/or inlet openings 121 on multiple or different walls of the enclosure 110, or in various parts of the enclosure 110 such as in dividers within the enclosure 110.

In some power generation systems 100, the mechanism 130 may be able to cover some of the openings 120, 121 while in other power generation systems 100 the mechanism 130 may be able to cover all openings 120, 121 in the enclosure 110. As an example, the power generation system 100 may include a mechanism 130 that controls a cover 131 that may covers an outlet opening 120, but may not include any mechanism 130 or cover 131 for covering the inlet opening 121. Alternatively, some power generation systems 100 may include one or more mechanisms that cover the inlet opening 121 (and/or other openings in the enclosure 110). In some examples, the power generation system 100 may include mechanisms that cover both of the inlet openings 121 and outlet openings 120. Other variations are possible.

In some systems, the power generation system 100 may further include a generator controller that may include the enclosure controller 150 and/or the module 140. As an example, the generator controller may be configured to control an operation of the generator 101. In other examples, the controller 150 and/or module 140 may be separate from a generator controller and/or each other.

The generator controller, the enclosure controller 150 and/or the module 140 may include hardware, software, firmware, or a combination. The generator controller, the enclosure controller 150 and/or the module 140 may include or access logic or instructions stored in a computer readable medium. The generator controller, the enclosure controller 150 and/or the module 140 may include a processor or processing component that may execute logic or instructions that are stored in the computer readable medium.

Figure 8:
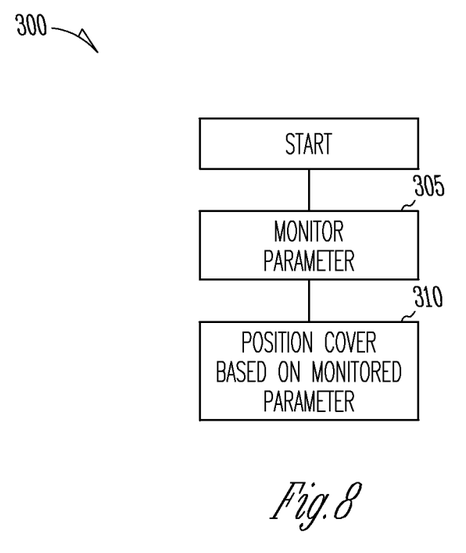
FIG. 8 is an example method for controlling an operation of an enclosure that houses a generator.

FIG. 8 is an example method 300 for controlling an operation of an enclosure that houses a generator 101. The method 300 may be performed partially, or entirely, by one or more of the module 140, enclosure controller 150 and/or a generator controller that controls the module 140, enclosure controller 150 or various other components of the power generation system 100. The method may be implemented as logic, which the module 140, enclosure controller 150 and/or generator controller may execute.

The module 140, enclosure controller 150 and/or generator controller may monitor a parameter of the power generation system 100 [305]. For example, the module 140 may measure a load L connected with the power generation system 100, and may send data related the measured load L to the enclosure controller 150, which may monitor a level of the load L.

Based on the measured parameter, the module 140, enclosure controller 150 and/or generator controller may manipulate the mechanism 130 [310]. As an example, the mechanism 130 may include a cover 131. The enclosure controller 150 may instruct the mechanism 130 to move the cover 131 in a direction toward the fully-opened position when a measured load L increases, and may instruct the mechanism 130 to move the cover 131 in a direction toward the fully-closed position when the load L decreases. Other variations and examples are possible.

Figure 9:
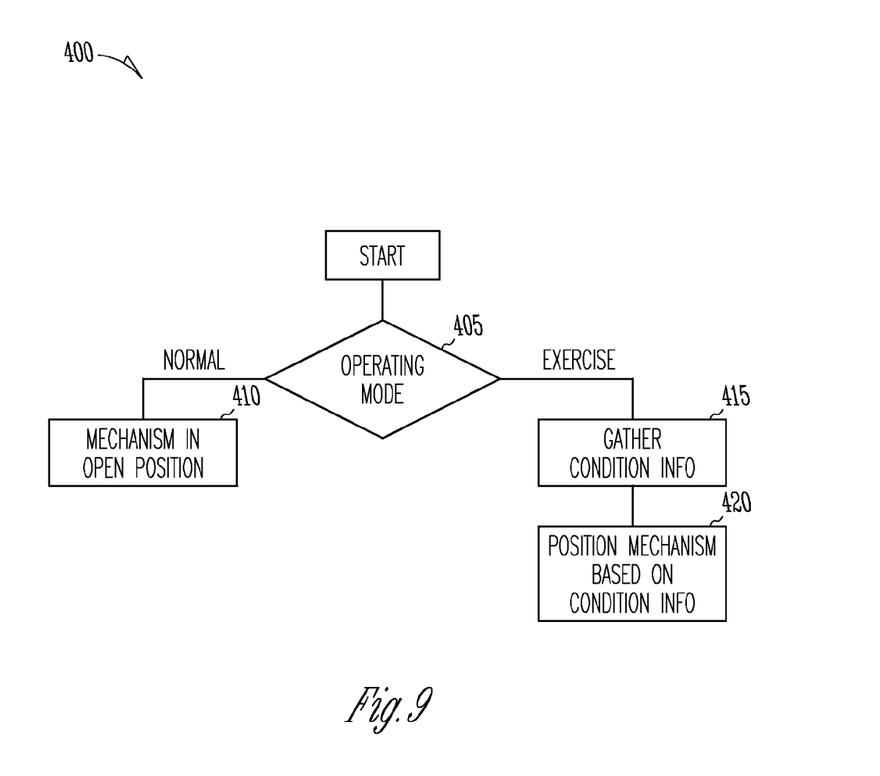
FIG. 9 is another example method for controlling an operation of an enclosure that houses a generator.

FIG. 9 is an example method 400 for controlling an operation of an enclosure 210 that houses a generator 201. The method 400 may be performed by the controller 240 or various other components of the power generation system 200, such as a generator controller. The method 400 may be implemented as logic, which the controller 240 may execute.

The controller 240 may determine, based on calculations, calendar information, user inputs, operating parameters, engine speed, power outputs, or some combination, whether the generator 201 is being run in normal mode or the exercise mode [405]. The determination [405] of whether the generator 201 is being run in normal mode or the exercise mode may be performed continuously, at intervals, periodically, randomly, when triggered, or at various other times. For example, in some systems, the controller 240 may perform the determination [405] upon detecting that the generator 201 has been turned on, or that an operating condition of the generator 201 has changed.

When the generator 201 is being operated in normal mode, the controller 240 may instruct the mechanism 230 to move the cover 260 to a fixed position, such as a fully-opened position [410]. The mechanism 230 (or mechanisms) may maneuver the cover 260 to a fully-opened position(s) in order to keep the enclosure 210 as cool as possible during normal operation of the generator 201.

When the generator 201 is being operated in exercise mode, the controller 240 or another component of the power generation system 200 may monitor or gather condition information about a condition which affects the operation of the generator [415]. The controller 240 may instruct the mechanism 230 (or mechanisms) to manipulate a position of the cover 260 based on the monitored condition [420]. For example, the controller 240 may monitor temperature information received from a sensor 250, such as an oil temperature sensor. Additionally or alternatively, the controller 240 may monitor any other parameter information gathered or received from various other sensors. When the generator 201 is operating in an exercise mode, the controller 240 may gather the monitored parameters and set a position of the cover 260 based on the monitored parameters.

In some systems, the controller 240 may compare the monitored condition with a parameter threshold to determine when the monitored condition exceeds the parameter threshold. The parameter threshold may correspond to a value of the measured parameter that, when reached, would indicate that the mechanism 230 needs to be adjusted. The parameter threshold may be set automatically or by a user. The controller 240 may perform the comparison continuously, periodically, at intervals, randomly, when triggered, or at various other times. Various other examples are possible.

The controller 240 may send a signal or instructions to the various components of the power generation system 200 to operate according to determined specifications. For example, the controller 240 may send instructions to the generator 201 to start when the controller 240 determines that the exercise mode should be initiated. In other examples, the controller 240 may not directly instruct a component to operate according to the determined specifications, but may instead instruct an intermediary component, such as an engine control unit, to operate the desired component (such as the engine 203). In still other examples, the controller 240 may actually operate the desired components themselves according to the determined specifications. Other variations and examples are possible.

The power generation system 200 may include, or be connected with, a user interface or display. The display may provide a visual or audible indicator to a user. This may be useful where a user wishes to monitor conditions that effect generator operation or the status of the exercise mode, or where the user may wish to manually start and stop the generator 201 from operating in the exercise mode. As an example, the display may provide information about the monitored condition, information about the operation of power generation system 200 such as its operating history and its present operating conditions, information about a load, or various other information. Other examples are possible.

The methods, devices, and logic described above may be implemented in many different ways in many different combinations of hardware, software or both hardware and software. For example, all or parts power generation system 200, such as the controller 240, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A power generation system comprising:
a generator that includes an alternator and an internal combustion engine configured to drive the alternator to generate power;
an enclosure that houses the internal combustion engine and the alternator, where the enclosure includes an opening that permits air to flow into or out of the enclosure;
a mechanism that regulates the air flow through the opening;
a module configured to monitor a load connected with the generator without using temperature to monitor the load; and
an enclosure controller that selectively manipulates the mechanism based on the monitored load.

2. The power generation system of claim 1, where the module is an engine control module that monitors a throttle of the internal combustion engine.

3. The power generation system of claim 1, where the mechanism includes a cover positioned adjacent to the opening.

4. The power generation system of claim 3, where the cover is configured to move between a fully-closed position where the opening is covered and a fully-opened position.

5. The power generation system of claim 4, where the enclosure controller is configured to move the cover to any position between the fully-closed position and the fully-opened position based on the monitored load.

6. The power generation system of claim 4, where the enclosure controller moves the cover in a direction toward the fully-opened position when the load connected with the generator increases; and
where the enclosure controller moves the cover in a direction toward the fully-closed position when the load connected with the generator decreases.

7. The power generation system of claim 1, where the enclosure includes a plurality of openings, and where the mechanism controls the air flowing through the plurality of openings.

8. The power generation system of claim 7, where at least one of the openings is an inlet opening that receives air flow into the enclosure, and at least one of the openings is an outlet opening that expels air flow from the enclosure.

9. The power generation system of claim 1, where the mechanism is inside the enclosure.

10. The power generation system of claim 1, further comprising a generator controller that includes the enclosure controller, the generator controller configured to control an operation of the generator.

11. A power generation system comprising:
a generator that includes an alternator and an internal combustion engine that drives the alternator to generate power, the generator configured to operate in a normal mode and an exercise mode, wherein the generator produces electricity when running in the normal mode and does not provide electricity to a load when running in the exercise mode; and
an enclosure that houses the internal combustion engine and the alternator, the enclosure includes an opening that permits air to flow into or out of the enclosure;
a mechanism to regulate the air flow through the opening;
a controller that manipulates the mechanism to control the air flow through the opening based on whether the generator is operating in the normal mode or the exercise mode, wherein the controller manipulates the mechanism differently depending on whether the generator is operating in the normal mode or the exercise mode;
a sensor configured to monitor a condition which affects the operation of the generator, where the controller manipulates the mechanism based on the monitored condition when the generator operates in the exercise mode, and where the sensor is configured to monitor something other than temperature.

12. The power generation system of claim 11, where the sensor is configured to monitor ambient light.

13. The power generation system of claim 11, where the sensor is configured to monitor a date.

14. The power generation system of claim 11, where the sensor is configured to monitor a location of the power generation system.

15. The power generation system of claim 11, where the controller is configured to move the mechanism to a fixed position when the generator is operating in the normal mode; and where the controller is configured to move the mechanism to any of a plurality of positions when the generator is operating in the exercise mode.

16. The power generation system of claim 11, where the controller ignores the monitored condition when the generator operates in the normal operating mode.

17. The power generation system of claim 11, where the enclosure includes a plurality of openings, and where the mechanism controls the air flow through the plurality of openings.

18. The power generation system of claim 17, where the controller manipulates the mechanism to independently regulate the air flow through each of the plurality of openings.

19. The power generation system of claim 18, further comprising a fan, where the controller manipulates the mechanism to move a particular opening to a fully-opened position when the fan is operating adjacent to the particular opening.

20. The power generation system of claim 11, where the sensor is configured to monitor a sound level produced by the power generation system.

* * * * *